(12) United States Patent
Denike et al.

(10) Patent No.: US 7,568,498 B2
(45) Date of Patent: Aug. 4, 2009

(54) ENGINEERED COMPOSITE QUIET CHECK VALVE

(75) Inventors: Stuart K. Denike, Phoenix, AZ (US); Joseph J. Jira, Laveen, AZ (US); G. Stephen McGonigle, Gilbert, AZ (US); Jeremiah J. Warriner, Laveen, AZ (US)

(73) Assignee: Honeywell International Inc., Morristown, NJ (US)

( * ) Notice: Subject to any disclaimer, the term of this patent is extended or adjusted under 35 U.S.C. 154(b) by 227 days.

(21) Appl. No.: 11/527,928

(22) Filed: Sep. 26, 2006

(65) Prior Publication Data

US 2008/0072974 A1    Mar. 27, 2008

(51) Int. Cl.
*F16K 17/00* (2006.01)
(52) U.S. Cl. ................. 137/512.1; 251/64
(58) Field of Classification Search ......... 137/512.1, 137/527, 15, 516, 554, 846, 375, 843, 527.4, 137/527.8, 527.6, 527.2, 512.15; 251/64, 251/368

See application file for complete search history.

(56) References Cited

U.S. PATENT DOCUMENTS

| | | |
|---|---|---|
| 2,877,792 A | 3/1959 | Tybus |
| 3,208,472 A | 9/1965 | Scarmucci |
| 3,538,946 A | 11/1970 | Hilsheimer |
| 3,589,404 A | 6/1971 | Spencer |
| 3,807,444 A | 4/1974 | Fortune |
| 4,079,751 A | 3/1978 | Partridge et al. |
| 4,230,148 A | 10/1980 | Ogle |
| 4,276,658 A | 7/1981 | Hanson |
| 4,456,180 A | 6/1984 | Lury |
| 4,786,031 A | 11/1988 | Waldrop |
| 4,792,117 A | 12/1988 | Kubota |
| 4,867,199 A | 9/1989 | Marx |
| 4,977,926 A | 12/1990 | Hocking |
| 5,246,032 A | 9/1993 | Muddiman |
| 5,285,816 A | 2/1994 | Herlihy |
| 5,392,810 A | 2/1995 | Cooper et al. |
| 5,392,825 A | 2/1995 | Mims et al. |
| 5,775,357 A | 7/1998 | Regna et al. |
| 5,934,648 A | 8/1999 | Rivers et al. |

(Continued)

FOREIGN PATENT DOCUMENTS

DE    10317505 A1    1/2005

(Continued)

OTHER PUBLICATIONS

EP Search Report 07117007.0, dated Jan. 16, 2008.

*Primary Examiner*—John Rivell
*Assistant Examiner*—Macade Brown
(74) *Attorney, Agent, or Firm*—Ingrassia Fisher & Lorenz, P.C.

(57) ABSTRACT

A check valve is provided that includes a valve body, a stop mechanism, and a flapper. The valve body includes a flowpath extending therethrough and a pair of stop supports extending axially therefrom. The valve body includes an engineered composite. The stop mechanism is integrally formed with the valve body and extends between the pair of stop supports. The stop mechanism includes the engineered composite. The flapper rotationally is coupled to the valve body and configured to be selectively moveable between an open and closed position in response to a pressure differential thereacross. The flapper includes the engineered composite.

13 Claims, 4 Drawing Sheets

U.S. PATENT DOCUMENTS

| | | | |
|---|---|---|---|
| 6,012,483 A * | 1/2000 | Beddies | 137/512.1 |
| 6,164,324 A | 12/2000 | Gradle | |
| 6,237,625 B1 * | 5/2001 | Randolph | 137/512.15 |
| 6,357,473 B1 | 3/2002 | Porter et al. | |
| 6,651,264 B2 * | 11/2003 | Halloran et al. | 4/378 |
| 6,726,715 B2 | 4/2004 | Sutherland | |
| 6,901,942 B2 | 6/2005 | Krimmer et al. | |
| 7,325,569 B2 * | 2/2008 | Denike et al. | 137/899.2 |
| 7,334,773 B2 * | 2/2008 | Stout et al. | 251/294 |
| 2005/0029482 A1 | 2/2005 | Johnson et al. | |
| 2006/0027270 A1 | 2/2006 | Truitt et al. | |
| 2006/0179800 A1 * | 8/2006 | Williams et al. | 55/312 |

FOREIGN PATENT DOCUMENTS

| | | |
|---|---|---|
| EP | 1691117 A1 | 8/2006 |
| GB | 2347890 | 9/2000 |

\* cited by examiner

ENGINEERED COMPOSITE QUIET CHECK VALVE

TECHNICAL FIELD

The present invention relates to check valves and, more particularly, to reducing noise produced by check valves.

BACKGROUND

Check valves may be employed in any one of numerous situations. For example, check valves may be used in an air distribution system to control an amount of air that flows from one portion of an aircraft to another. In this regard, check valves may be disposed in a duct between an air source and one or more outlets for exhausting the received air to desired areas within the aircraft, such as, for example, to an aircraft cabin or an underfloor section of the aircraft.

One exemplary type of check valve that has been employed in aircraft is a split flapper check valve. A split flapper check valve typically includes a valve body, a pair of flappers, and a stop mechanism. The valve body is configured to be inserted into the air distribution system duct and includes an upstream side, a downstream side, and a pair of flow channels that extends between the upstream and downstream sides. A pair of stop supports extends axially away from the valve body, and the stop mechanism is coupled to and extends between the stop supports. The flappers are rotationally mounted on the valve body, and are moveable between closed and open positions to control flow through the flow channels.

Generally, split flapper check valve components are made of metallic materials. Although these materials are adequate for producing check valves, they present certain drawbacks. Specifically, metallic materials are typically relatively heavy, thus components made from these materials may increase the weight of an aircraft when implemented therein. Moreover, manufacturing check valves from metallic materials may be relatively time-consuming and expensive. Additionally, metallic check valves may produce relatively loud noises during valve operation. During flight, the noise may be audible to passengers in the aircraft, which may not be desirable.

Accordingly, there is a need for a split flapper check valve that is lightweight and relatively inexpensive to manufacture. These is also a need for a split flapper check valve that reduces noise produced when the flappers and stop mechanism of a split flapper check valve contact each other. Furthermore, other desirable features and characteristics of the present invention will become apparent from the subsequent detailed description and the appended claims, taken in conjunction with the accompanying drawings and the foregoing technical field and background.

BRIEF SUMMARY

The present invention provides a check valve for disposal in a duct.

In one embodiment, and by way of example only, the check valve includes a valve body, a stop mechanism, and a flapper. The valve body includes a flowpath extending therethrough and a pair of stop supports extending axially therefrom. The valve body includes an engineered composite. The stop mechanism is integrally formed with the valve body and extends between the pair of stop supports. The stop mechanism includes the engineered composite. The flapper rotationally is coupled to the valve body and configured to be selectively moveable between an open and closed position in response to a pressure differential thereacross. The flapper includes the engineered composite.

In another embodiment, and by way of example only, a valve component for sealing a valve body is provided having a stop mechanism extending therefrom. The valve component includes a flapper and an elastomeric material. The flapper is configured to be selectively moveable between an open and closed position in response to a pressure differential thereacross. The flapper includes an engineered composite. The elastomeric material is integrally molded into the flapper.

In yet another embodiment, and by way of example only, a check valve component is provided that includes a valve body and a stop mechanism. The valve body includes a flowpath extending therethrough and a pair of stop supports extending axially therefrom. The valve body includes an engineered composite. The stop mechanism includes the engineered composite integrally formed with the valve body and extends between the pair of stop supports.

In still yet another embodiment, a method of manufacturing a check valve component is provided. The method includes the steps of placing an elastomeric material into a portion of a mold, where the mold is configured to complement a flapper configured to be selectively moveable between an open and closed position in response to a pressure differential thereacross, and injecting an engineered composite material into the mold to form the flapper.

In yet another embodiment, a method of manufacturing a check valve is provided that includes the step of injecting an engineered composite material into a mold, where the mold is configured to complement a valve body and a stop mechanism formed on the valve body, the valve body has a flowpath extending therethrough and a pair of stop supports extending axially therefrom, and the stop mechanism extends between the pair of stop supports.

Other independent features and advantages of the preferred check valve will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
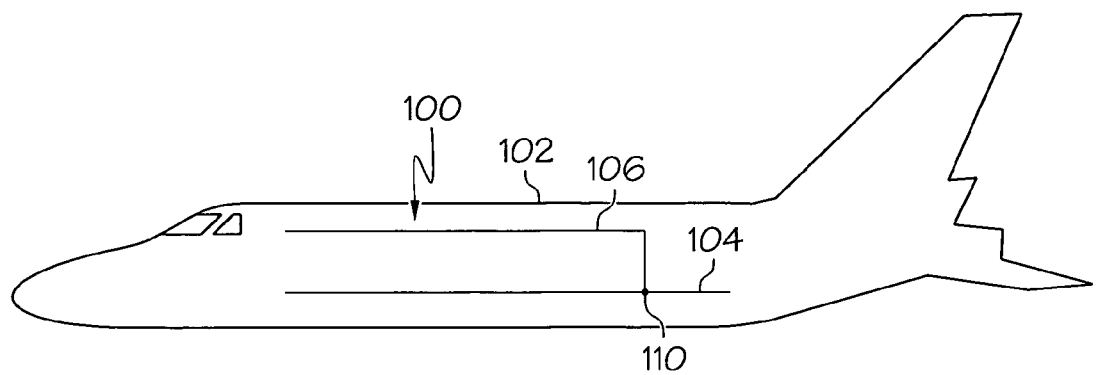
FIG. 1 is a simplified schematic diagram illustrating an air distribution system.

FIG. 1 is a simplified schematic diagram illustrating an air distribution system 100 disposed within an aircraft 102. The air distribution system 100 includes an inlet duct 104, one or more outlet ducts 106 (only one of which is shown here), and a valve 110 positioned in duct 106. The inlet duct 104 receives air from an air source, such as, for example, engine bleed air, and the outlet duct 106 exhausts air into desired sections of the aircraft 102. In one exemplary embodiment, the outlet duct 106 exhausts air into an aircraft cabin (not shown). The valve 110 is configured to control the air flow through the outlet duct 106 and to open and close when a pressure differential across the valve 110 exceeds a predetermined value.

Figure 2:
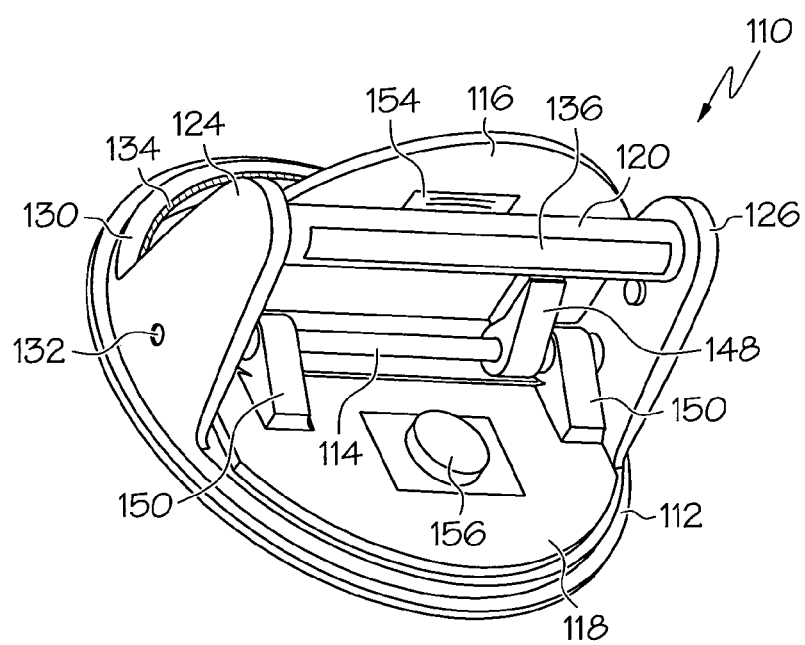
FIG. 2 is a perspective view of a split flapper check valve that may be implemented into the system shown in FIG. 1.
Figure 3:
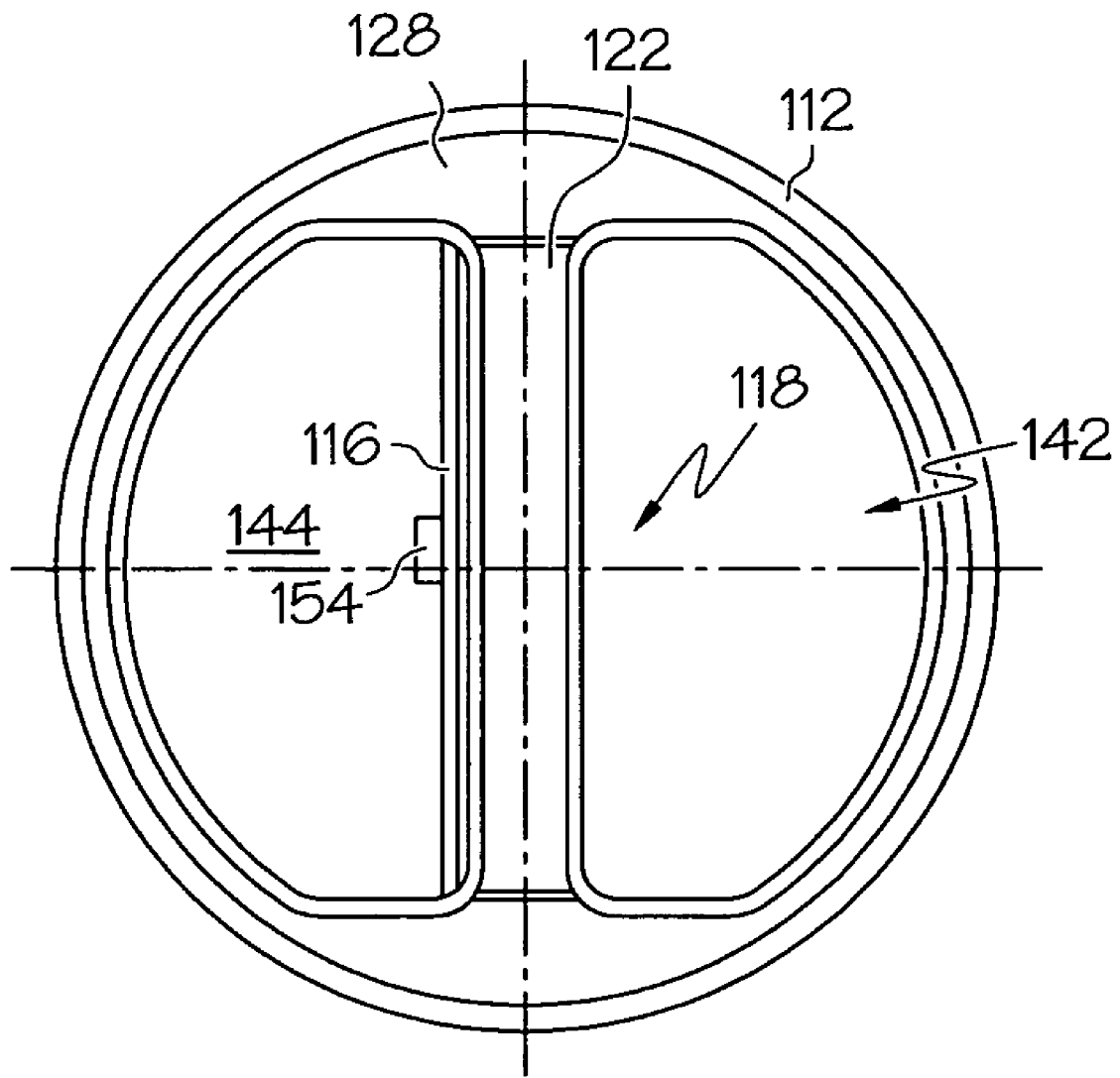
FIG. 3 is a forward view of the split flapper check valve shown in FIG. 2.

Turning now to FIGS. 2 and 3, an exemplary physical implementation of the valve 110 is depicted. The valve 110 includes a valve body 112, a shaft 114, and two flappers 116, 118. The valve body 112 is configured to be coupled to and disposed at least partially within the duct 106, and has a support bar 122, two stop supports 124, 126, and a stop mechanism 120. The valve body 112 is annularly shaped and has an upstream end 128, a downstream end 130, and a pair of flow channels 142, 144 that extend therebetween. The flow channels 142, 144 are separated from each other via the support bar 122. The two stop supports 124, 126 extend axially from the valve body 112 and are generally spaced equally apart from one another. The stop supports 124, 126 include a pairs of mount holes 132 for mounting the shaft 114. The stop mechanism 120 extends between the stop supports 124, 126 and prevents the flappers 116, 118 from contacting each other when in a full open position.

The support bar 122, stop supports 124, 126, and stop mechanism 120 are integrally molded with the valve body 112. Preferably, each of the components is made from an engineered composite that is lightweight and inexpensive relative to conventionally used metallic valve materials. The engineered composite may be any suitable material, including, but not limited to polyetheretherketone and polyethyleneimide, or may be a material (including, but not limited to polyetheretherketone or polyethyleneimide) that includes filler materials, such as carbon epoxy fibers or a glass filler.

In some embodiments, the valve body 112 includes a valve seat 134 located on its downstream end 130. The valve seat 134 is configured to improve sealing between the valve body 112 and flappers 116, 118 and is made of a different material than the valve body 112 integrally molded therewith. In one example, the valve seat 134 is made of an elastomeric material, such as fluorosilicone. In another example, the valve seat 134 is made of steel, aluminum, or polyetherimide.

In still other embodiments, the stop mechanism 120 is configured to minimize noise when contacting the flappers 116, 118. In this regard, the stop mechanism 120 may include an elastomeric portion 136 integrally formed thereon. The elastomeric portion 136 may be a layer or coating formed over the engineered composite, or may be a protrusion extending from the stop mechanism 120.

The flappers 116, 118 are configured to at least partially seal and unseal the flow channels 142, 144, and are each rotationally mounted to the valve body 112, preferably via the shaft 114. Each flapper 116, 118 includes lugs 148, 150 and protrusions 154, 156 that extend axially therefrom and that are integrally molded therewith. The lugs 148, 150 include mount holes (not shown) that correspond to and align with the stop support mount holes 132 and allow the shaft 114 to extend therethrough.

Figure 4:
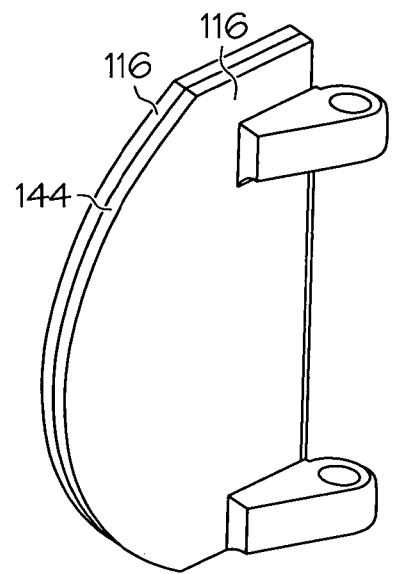
FIG. 4 is a perspective view of an exemplary flapper.
Figure 5:
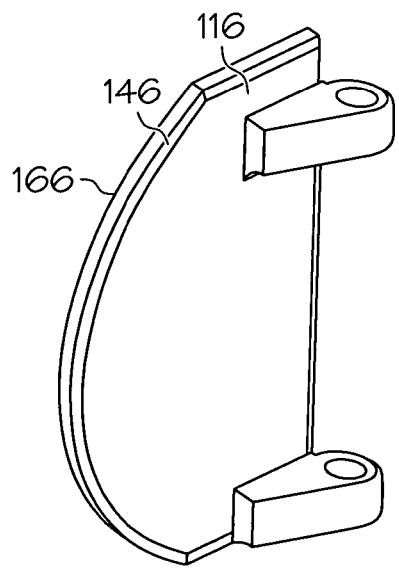
FIG. 5 is a a perspective view of another exemplary flapper.

To further reduce noise that may be produced by the valve 110, the two flappers 116, 118, are also made of a suitable engineered composite material. The engineered composite material may be the same as or different than the materials used to manufacture the valve body 112. In an alternate embodiment, shown on one flapper 116 in FIG. 4, a coating 144 is integrally formed over the engineered composite material. The coating may be an elastomeric material. Alternatively, as shown in FIG. 5, a contact surface 146 may be formed on an outer periphery of the flapper 116 and may be made of the elastomeric material.

Figure 6:
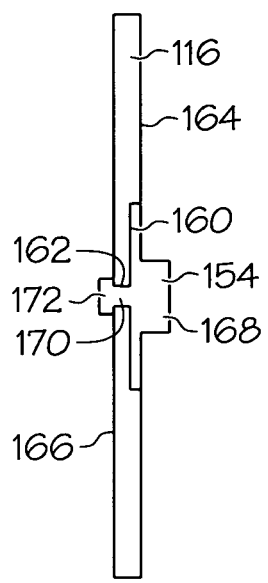
FIG. 6 is a cross section view of the flapper shown in FIG. 2 including a protrusion.
Figure 7:
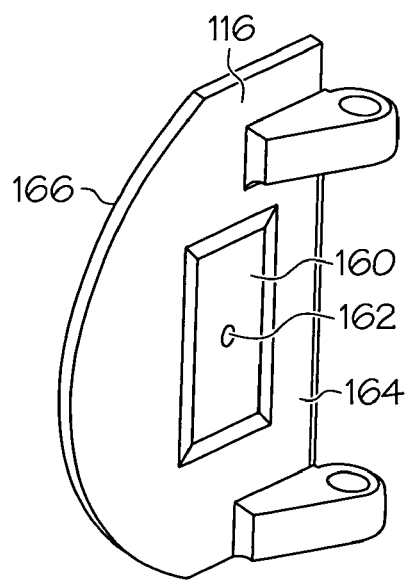
FIG. 7 is a perspective view of the exemplary flapper shown in FIG. 6.

Returning now to FIGS. 2 and 3, the lugs 148, 150 and protrusions 154, 156 may also be manufactured from the engineered composite material. In some embodiments, one or more of the lugs 148, 150 and protrusions 154, 156 may be coated with another material, such as an elastomeric material. In other embodiments, one or more of the lugs 148, 150 and protrusions 154, 156 themselves may be made of other materials. For example, one or both of the protrusions 154, 156 may be made of elastomeric material. In this case, the flappers 116, 118 may be designed to accommodate the elastomeric protrusions 154, 156. One example of such a configuration is depicted in FIGS. 6 and 7. It will be appreciated that although only one flapper 116 is depicted, both may alternatively have the same configuration. Here, the flapper 116 includes a depression 160 formed therein within which the protrusion 154 is disposed. The depression 160 is preferably formed on a downstream side 164 of the flapper 116. The flapper 116 may include a mount hole 162 that extends at least partially therethrough while communicating with the depression 160. A portion of the protrusion 154 is disposed within the mount hole 162. In other embodiments, such as the embodiment shown in FIG. 6, the mount hole 162 extends through the flapper 116 to an upstream side 166 thereof. The protrusion 154 has a contact portion 168 and a connector portion 170. The contact portion 168 is preferably sized larger than the mount hole 162 and is partially disposed within and extends axially from the depression 160. The connector portion 170 extends through the mount hole 162. In still other embodiments, the protrusion 154 also has a mount portion 172 that is disposed on the flapper upstream side 166 to further secure the protrusion 154 to the flapper 116.

In addition to reducing valve noise, the above-described valves 110 are advantageously easily and inexpensively manufactured. Preferably, the valve body 112 and the flappers 116, 118 are made using an injection molding process. For example, in the manufacture of the valve body 112, the engineered composite is injected into a mold that is shaped to complement the valve body 112 and subsequently cured. In embodiments in which the valve body 112 includes a valve seat 134 or a coating on the stop mechanism 120, an elastomeric material is disposed in an appropriate location of the mold prior to the injection of the engineered composite. In this way, the valve seat 134 and/or stop mechanism 120 coating become integrally molded with the valve body 112.

With regard to the manufacture of the flappers 116, 118, the engineered composite material is injected into a mold shaped complementary to one of the flappers 116, 118 and subsequently cured. In other embodiments, one or more locations on the mold may be initially filled with the elastomeric material to produce the flapper 116, 118 coating, lug 148, 150 coating, or protrusion 154, 156 coating. In still other embodiments, an elastomeric piece that forms the protrusion 154, 156 is inserted into an appropriate location on the mold and the engineered composite material is injected into the mold.

The valve 110 described above produces a minimal amount of noise. In addition, the valve 110 is lightweight, inexpensive to manufacture, and easily implemented into existing systems.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims

We claim:

1. A check valve comprising:
    a valve body including a flowpath extending therethrough and a pair of stop supports extending axially therefrom, the valve body comprising an engineered composite;
    a stop mechanism integrally formed with the valve body and extending between the pair of stop supports, the stop mechanism comprising the engineered composite;
    a flapper rotationally coupled to the valve body and configured to be selectively moveable between an open and closed position in response to a pressure differential thereacross, the flapper comprising the engineered composite; and
    a protrusion disposed on the flapper inwardly from an outer periphery of the flapper, the protrusion comprising an elastomeric material integrally molded with the engineered composite of the flapper and configured to contact the stop mechanism when the flapper is in the open position,
    wherein:
    the flapper has a first side, a second side, a depression formed in the first side, and a mount hole extending between the first side and the second side, and
    the protrusion has a first portion disposed in the mount hole and a second portion disposed in the depression.

2. The check valve of claim 1, wherein:
    the valve body includes a downstream end;
    the check valve further comprises a valve seat integrally molded on the downstream end; and
    the valve seat comprises an elastomeric material.

3. The check valve of claim 1, wherein the flapper comprises an elastomeric material integrally molded into an outer periphery thereof.

4. The check valve of claim 1, wherein the stop mechanism includes an elastomeric coating integrally molded thereon.

5. The check valve of claim 1, wherein the engineered composite comprises polyetheretherketone.

6. The check valve of claim 5, wherein the engineered composite comprises a filler material.

7. The check valve of claim 1, wherein the engineered composite comprises polyetherimide.

8. The check valve of claim 7, wherein the engineered composite comprises a filler material.

9. A valve component for sealing a valve body having a stop mechanism extending therefrom, the valve component comprising:
    a flapper configured to be selectively moveable between an open and closed position in response to a pressure differential thereacross, the flapper comprising an engineered composite; and
    an elastomeric material integrally molded into the engineered composite of the flapper, wherein a portion of the elastomeric material forms a protrusion extending axially away from the flapper and disposed inwardly from an outer periphery of the flapper, the protrusion configured to contact the stop mechanism when the flapper is in the open position,
    wherein:
    the flapper has a first side, a second side, a depression formed in the first side, and a mount hole extending between the first side and the second side, and
    the protrusion has a first portion disposed in the mount hole and a second portion disposed in the depression.

10. The check valve of claim 9, wherein the flapper has an outer periphery and the elastomeric material is integrally molded with the flapper outer periphery.

11. The check valve of claim 10, wherein the flapper has a side and the elastomeric material coats at least a portion of the flapper side.

12. The check valve of claim 1, wherein the flapper includes a lug extending axially from the flapper.

13. The check valve of claim 12, wherein the lug includes a coating comprising an elastomeric material.

* * * * *